Oct. 4, 1927.

G. W. PACKER

SCRAPER

Original Filed Oct. 1, 1921

1,644,269

INVENTOR:
GLENN W. PACKER
BY: Clarence F. Poole
ATTORNEY

Patented Oct. 4, 1927.

1,644,269

UNITED STATES PATENT OFFICE.

GLENN W. PACKER, OF CHICAGO, ILLINOIS, ASSIGNOR TO GOODMAN MANUFACTURING COMPANY, OF CHICAGO, ILLINOIS, A CORPORATION OF ILLINOIS.

SCRAPER.

Application filed October 1, 1921, Serial No. 504,620. Renewed March 28, 1927.

This invention relates to improvements in scrapers used for transporting loose material, and more particularly to scrapers adapted to have reciprocating movement toward and away from the material to be transported.

In my copending application Serial No. 470,771, filed May 19, 1921, I have shown and described a scraper of the above description having a rear wall portion pivotally connected so as to be opened and closed by the draft ropes used for reciprocably operating the scraper.

The object of the present invention is to provide an improved construction of a scraper of the class described, as will hereinafter more fully appear.

Figure 1:
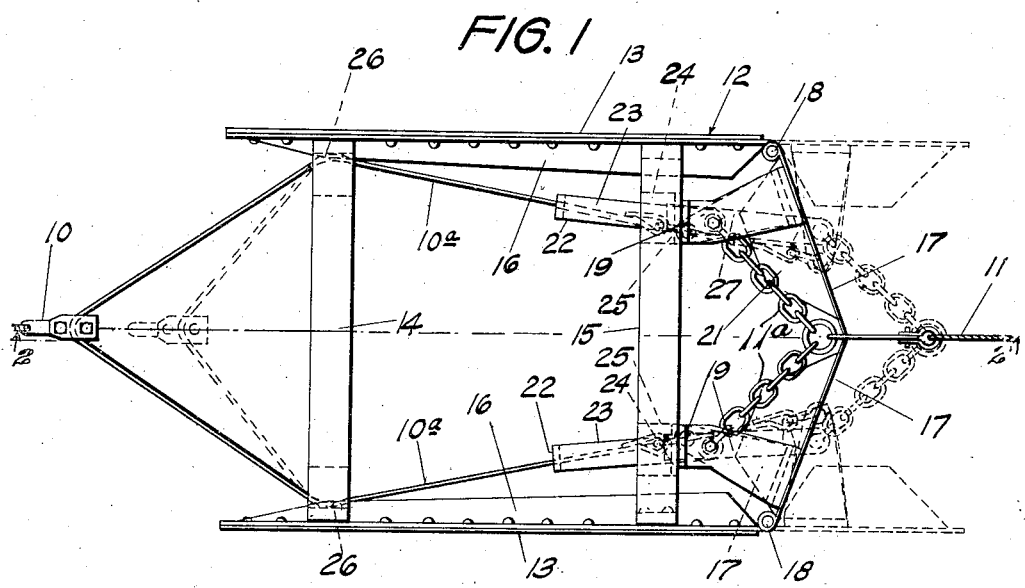
Figure 2:
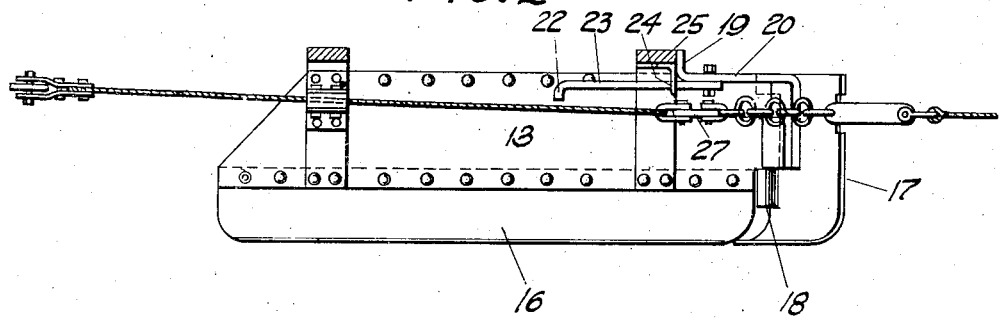

In the drawing, Figure 1 is a top plan view of a scraper constructed in accordance with my invention. Fig. 2 is a vertical cross-section of the scraper taken on line 2—2 of Fig. 1.

The scraper shown in the drawing is provided with flexible draft ropes comprising a head rope 10 and a tail rope 11, for moving the scraper forwardly and rearwardly respectively. The scraper apparatus is set up in any suitable manner, with the draft ropes trained over fixed guides or sheaves and operatively connected with any suitable power device such as a hoisting engine.

The scraper comprises a body portion 12 having side walls 13, 13, connected by front and rear cross members 14 and 15 respectively. The drawings illustrate a preferred form of the scraper having no bottom, but a bottom may be desirable under some circumstances and may be provided without departing from the scope of my invention.

The bottom margins of the side walls 13, 13, are preferably inclined or turned inwardly to form substantially horizontal cutting edges 16, 16, as shown.

The rear end of the scraper comprises two upright wall portions 17, 17, each pivotally connected to the rear end of a side wall as indicated at 18, 18. The arrangement is such that the pivoted wall portions normally form a closure for the rear end of the scraper, but each wall portion is mounted to swing laterally and rearwardly into substantial alignment with its adjacent side wall 13. The forward movement of each of the wall portions is limited by a stop 19, carried on a forwardly projecting arm 20, attached to the wall portions, said stop being adapted to engage the cross member 15. The bottom margins of the rear wall portions 17, 17, are preferably inclined or turned inwardly to form cutting edges 21, 21, similar to the cutting edges 16, 16, in the side walls.

Referring now to one of the novel features of the present invention, it will be observed that I provide an improved means for limiting the rearward movement of the wall portions 17, 17. Each of said wall portions is provided with a stop 22, carried on a forward end of a bar 23, pivotally connected to a forwardly projecting arm 20, and extending through a slot 24 formed in a stop member 25 attached to the cross member 15. The stops 22, 22, each positively limit the outward movement of its respective wall portion 17. The stop bars 23, 23, are disposed on a substantially parallel relation with the side walls of the scraper, when the wall portions 17, 17, are in opened position so as not to interfere with the loading of the scraper. During the closing of the wall portions 17, 17, the said bars are moved forwardly in a substantially longitudinal direction so as to meet a minimum amount of resistance from such loose material as is in the scraper.

Means co-acting with the draft ropes for actuating the rear wall portions comprises a pair of flexible terminals 10ª, 10ª, connected to the head rope 10, and a pair of flexible terminals 11ª, 11ª, connected to the tail rope 11. The terminals 10ª, 10ª, are trained through a suitable guide 26 adjacent the front end of a side wall 13 and from thence to a supporting member 27 attached to and extending forwardly from a wall portion 17 below the before-mentioned arm 20 thereon. It will be observed that the present construction differs from that disclosed in my prior application, inasmuch as the head rope terminals are attached directly to the rear wall portions 17, 17, instead of being passed about a pair of sheaves mounted on members corresponding with the supporting members 27, 27, and having their ends attached to the cross arm 15 of the scraper. The present construction is simpler and is found to be preferable under certain operating conditions, as for instance, when the material to be gathered is relatively light, and the pivoted wall portions may be readily and quickly closed by a direct pull on the head rope.

Although I have shown and described one form in which my invention may be embodied, it will be understood that many other means may be employed for accomplishing the same results without departing from the spirit and scope of my invention. I do not therefore wish to be understood as limiting myself to the specific construction illustrated herein excepting as specifically limited in the appended claims.

I claim as my invention:

A scraper comprising a body portion, and a pivoted rear end portion, draft means for reciprocably moving said scraper having operative connection with said pivoted end portion to swing the latter in opposite directions, and means limiting the rearward movement of said end portion comprising an arm mounted on said end portion and a stop member pivotally connected with said arm and extending forwardly therefrom in a generally longitudinal direction, and adapted to engage a fixed portion on the scraper body.

Signed at Chicago, in the county of Cook and State of Illinois, this 29 day of September, 1921.

GLENN W. PACKER.